United States Patent
Kato

(10) Patent No.: US 9,418,096 B2
(45) Date of Patent: Aug. 16, 2016

(54) CONTROL METHOD, AND INFORMATION PROCESSING SYSTEM

(71) Applicant: FUJITSU LIMITED, Kawasaki-shi, Kanagawa (JP)

(72) Inventor: Jun Kato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 231 days.

(21) Appl. No.: 14/210,516

(22) Filed: Mar. 14, 2014

(65) Prior Publication Data

US 2014/0289200 A1    Sep. 25, 2014

(30) Foreign Application Priority Data

Mar. 21, 2013    (JP) .................................. 2013-059038

(51) Int. Cl.
*G06F 17/00* (2006.01)
*G06F 17/30* (2006.01)

(52) U.S. Cl.
CPC ................ *G06F 17/30371* (2013.01)

(58) Field of Classification Search
CPC .............. G06F 9/30145; G06F 3/0484; G06F 11/3688; G06F 17/30864; G06F 17/5009
See application file for complete search history.

(56) References Cited

U.S. PATENT DOCUMENTS

2001/0039548 A1    11/2001    Shinkai et al.
2010/0100529 A1*   4/2010    Erofeev .............. G06F 11/1456
                                                              707/610

FOREIGN PATENT DOCUMENTS

JP    2000-242620    9/2000
JP    2002-014861    1/2002

OTHER PUBLICATIONS

Jeff Terrace et al., "Object Storage on CRAQ: High-throughput chain replication for read-mostly workloads", Proc. USENIX Annual Technical Conference (USENIX '09), San Diego, CA, pp. 1-16, Jun. 2009.

* cited by examiner

*Primary Examiner* — Truong Vo
(74) *Attorney, Agent, or Firm* — Staas & Halsey LLP

(57) ABSTRACT

A control method is used in an information processing system which has a plurality of computers. The control method includes receiving, by a first computer of the plurality of computers, an update request of data from a first client device, receiving, by a second computer of the plurality of computers, a read request of the data from a second client device. The control method also includes selecting, by the second computer, a computer as an query destination from the plurality of computers excluding the first computer and a third computer that is a terminal to receive the update request sent from the first computer, when the data is undergoing updating due to the update request; transmitting a verify request to inquire whether the data is undergoing updating, to the query destination; and transmitting the data to the second client device based on a reply from the query destination.

16 Claims, 13 Drawing Sheets

| | 1ST | 2ND | 3RD | 4TH | 5TH | 6TH | 7TH | 8TH |
|---|---|---|---|---|---|---|---|---|
| 1ST | 0 | 100 | 100 | 100 | 100 | 100 | 100 | 100 |
| 2ND | 100 | 0 | 1 | 1 | 100 | 100 | 100 | 100 |
| 3RD | 100 | 1 | 0 | 1 | 100 | 100 | 100 | 100 |
| 4TH | 100 | 1 | 1 | 0 | 100 | 100 | 100 | 100 |
| 5TH | 100 | 100 | 100 | 100 | 0 | 100 | 100 | 100 |
| 6TH | 100 | 100 | 100 | 100 | 100 | 0 | 1 | 100 |
| 7TH | 100 | 100 | 100 | 100 | 100 | 1 | 0 | 100 |
| 8TH | 100 | 100 | 100 | 100 | 100 | 100 | 100 | 0 |

CONTROL METHOD, AND INFORMATION PROCESSING SYSTEM

CROSS-REFERENCE TO RELATED APPLICATION

This application is based upon and claims the benefit of priority from the prior Japanese Patent Application No. 2013-059038 filed on Mar. 21, 2013, the entire contents of which are incorporated herein by reference.

FIELD

The embodiment discussed herein relates to an information processing system, and a method of controlling the information processing system.

BACKGROUND

Conventionally, an information processing system, in which data among a plurality of nodes is replicated and stored such as NoSQL represented by distributed key value stores (KVS), includes multipath replication as a method for updating replica when a data write occurs.

In this case, a node is an information processor apparatus provided with a central processing unit (CPU), a memory, a disk device and the like. Multiple nodes are interconnected over a network. A replica is the reproduction of data. The information processing system functions as a distributed storage system. Each node in the information processing system functions as a storage system for distributing and storing data.

FIGS. 12A and 12B are diagrams for explaining the multipath replication. As illustrated in FIG. 12A, an information processing system 90 includes a data center X and a data center Y. The data center X includes nodes from a node 91 that stores data of a first replica to a node 94 that stores data of a fourth replica. The data center Y includes a node 95 that stores data of a fifth replica. The node that stores the first replica is simply called a "first replica" in FIGS. 12A and 12B. Nodes for storing other replicas are represented in the same way.

When a client 81 writes data to the node 91 that stores the first replica, the node 91 sends an update request to the node 92 that stores the second replica, to the node 93 that stores the third replica, and to the node 94 that stores the fourth replica. The node 92, the node 93, and the node 94 then send update requests to the node 95.

Specifically, the information processing system 90 sends the update requests in parallel along three paths: first→second→fifth, first→third→fifth, and first→fourth→fifth, that is, in a multipath manner.

When the update requests reach the terminal node 95 from all the paths, updated requests are sent back along the three paths as illustrated in FIG. 12B. That is, the updated requests are sent along three paths: fifth→second→first, fifth→third→first, and fifth→fourth→first. Each node updates the replica for the new data included in the update request upon receiving the updated request.

A feature of the multipath replication is a mechanism for maintaining consistency of data. Consistency between data in this case signifies the fact that the same data is seen regardless of which replica is accessed. A problem in data consistency is exemplified in FIG. 13.

FIG. 13 illustrates a case where, although update requests reach the terminal through the two paths of first→second→fifth and first→third→fifth, the node 92 receives a reading request for the data from a client 82 when the update request from the remaining path first→fourth→fifth has not yet reached the terminal. In this case, the node 92 may return either the new data included in the update request or old data that has not yet been updated, to the client 82. However, data consistency implies that another node returns the same data even if another node is accessed by the client 82 in this way.

For example, if the node 95 that stores the fifth replica returns the new data, the node 92 that stores the second replica also returns the new data in FIG. 13. If the node 95 that stores the fifth replica returns the old data, the node 92 that stores the second replica also returns the old data. This type of data consistency is called strong consistency.

The multipath replication achieves the data consistency by using a version function in multipath replication (see, for example, Jeff Terrace and Michael J. Freedman, "Object Storage on CRAQ: High-throughput chain replication for read-mostly workloads", Proc. USENIX Annual Technical Conference (USENIX'09), San Diego, Calif., June 2009). FIG. 13 illustrates a case of maintaining data consistency using the version function. A plurality of nodes in which data candidates are returned to the client 82, such as the node 92 that stores the second replica, send a version request to the node 95 that is the terminal node. Then, which data is to be sent to the client 82 is determined.

The terminal node 95 that receives the version request determines whether the reception of the update requests from all the paths and the updating of the replicas has been completed. For example, as illustrated in FIG. 13, the terminal node 95 determines that the replicas are not updated yet since the update request from the path, first→fourth→fifth, has not been received. As a result, the terminal node 95 sends a reply to the node 92 that stores the second replica to return the old data. Since data updating is conducted first by the terminal node 95, data consistency may be maintained by establishing the version of the data stored by the terminal as the base.

Japanese Laid-open Patent Publication No. 2000-242620 discloses a technique in a system having a plurality of replicating nodes in which a node mediating requests from clients among the replicating nodes replies with a scale for indicating the degree of newness of the data that is received from the replicating nodes.

However, as illustrated in FIG. 13, there is a problem that when the node 92 sends a version request to the terminal node 95 in a different data center Y, a reply with respect to a data reading request may not be made and thus the response time is delayed.

When replicas are arranged, in general various replicas are often placed in different data centers far away from each other in consideration of data distribution and enabling disaster recovery in case of natural disasters. For example, an operation is common in which the data center X is a backbone data center of a storage system in Tokyo, while the data center Y is a remote data center for disaster recovery in San Francisco. Reading performance may be improved since data reading requests are processed by being distributed among many nodes due to the increase in the number of replicas.

The system illustrated in FIG. 13 is a system for handling the above conditions and version requests are preferably not sent to a remote data center in the system illustrated in FIG. 13.

SUMMARY

According to an aspect of the invention, a control method includes receiving, by a first computer of a plurality of computers in which data is replicated between the plurality of computers and stored, an update request of the data from a first client device; sending the update request from the first computer to at least one of the plurality of computers; receiving, by a second computer of the plurality of computers, a read request of the data from a second client device; selecting, by the second computer, one of the plurality of computers as an query destination, excluding the first computer and a third computer that is a terminal to receive the update request sent from the first computer; transmitting a verify request from the second computer to inquire whether the update request has been received, to the query destination; and transmitting the data from the second computer to the second client device based on a reply from the query destination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of a distance information storage unit;

DESCRIPTION OF EMBODIMENT

The following discusses embodiments of a control program for controlling an information processing system and an information processor apparatus, and a method of controlling the information processing system with reference to the drawings. The embodiments are not intended to limit the following techniques.

Figure 1A:
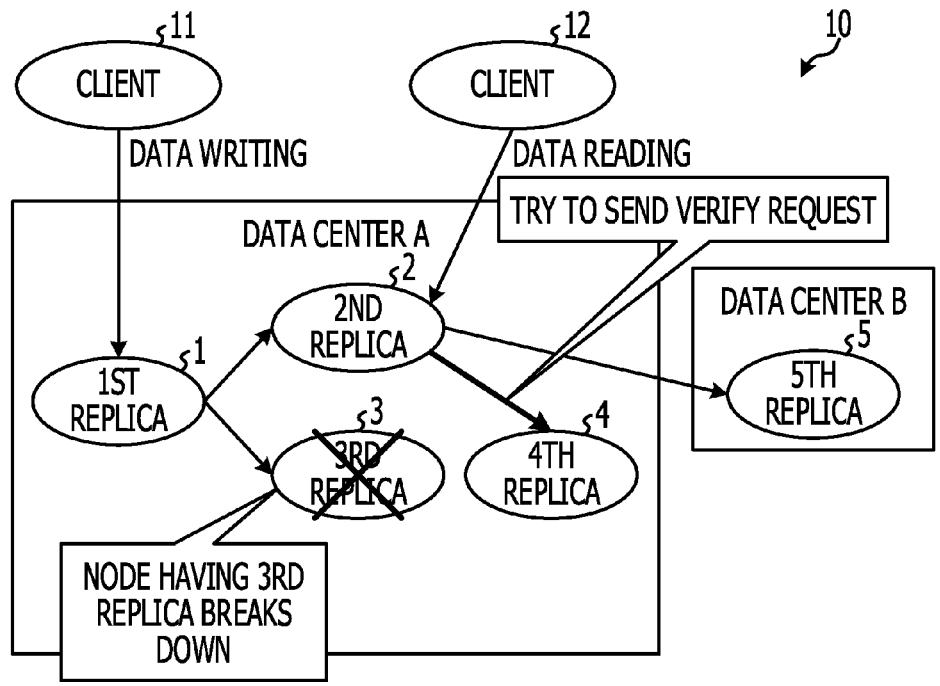
FIG. 1A is a diagram for explaining data reading processing by an information processing system according to an embodiment.

Data reading processing by an information processing system according to an embodiment will be discussed first. FIG. 1A is a diagram for explaining data reading processing by an information processing system according to an embodiment. As illustrated in FIG. 1A, an information processing system 10 includes a data center A and a data center B. The data center A includes nodes from a node 1 which stores data of a first replica to a node 4 which stores data of a fourth replica. The data center B includes a node 5 that stores data of a fifth replica.

When data is written by a client 11 to the node 1, the node 1 sends an update request to both a node 2 that stores the second replica and a node 3 that stores the third replica. The node 3 sends the update request to a node 4, and both the node 2 and the node 4 send the update request to the node 5.

Specifically, the information processing system 10 sends the update requests in parallel along two paths: first→second→fifth and first→third→fourth→fifth, that is, in a multipath manner, when writing in the first replica is performed by the client 11.

If the node 3 breaks down at this time, the update request is sent on the first→second→fifth path, but not on the first→third→fourth path, and the node 4 does not receive the update request.

When a request for reading the data undergoing updating is made by a client 12 to the node 2 in this state, a version request is sent to the node 5 and a verify request is sent to the node 4. The verify request is a request for confirming whether an update request has been received. The node 4 replies to the node 2 that the update request has not been received in response to the verify request. Therefore, the node 2 learns that the node 5 that is the terminal node did not receive the update request through the node 4. The node 2 then returns old data to the client 12.

When comparing the node 5 and the node 4 in this case, the node 4 and the node 2 are in the same data center A while the node 5 is in the data center B that is different from the data center of the node 2. As a result, if the distance between the data center A and the data center B is great, the node 2 may receive the reply from the node 4 concerning the verify request faster than the reply concerning the version request from the node 5. Therefore, the node 2 is able to reply to the client 12 earlier.

In this way, the information processing system 10 uses the verify request to allow for an earlier reply to a writing request with respect to updated data. While the node 2 and the node 4 are both in the same data center in this explanation, the node 2 may also send the verify request to a node in a different data center.

Figure 1B:
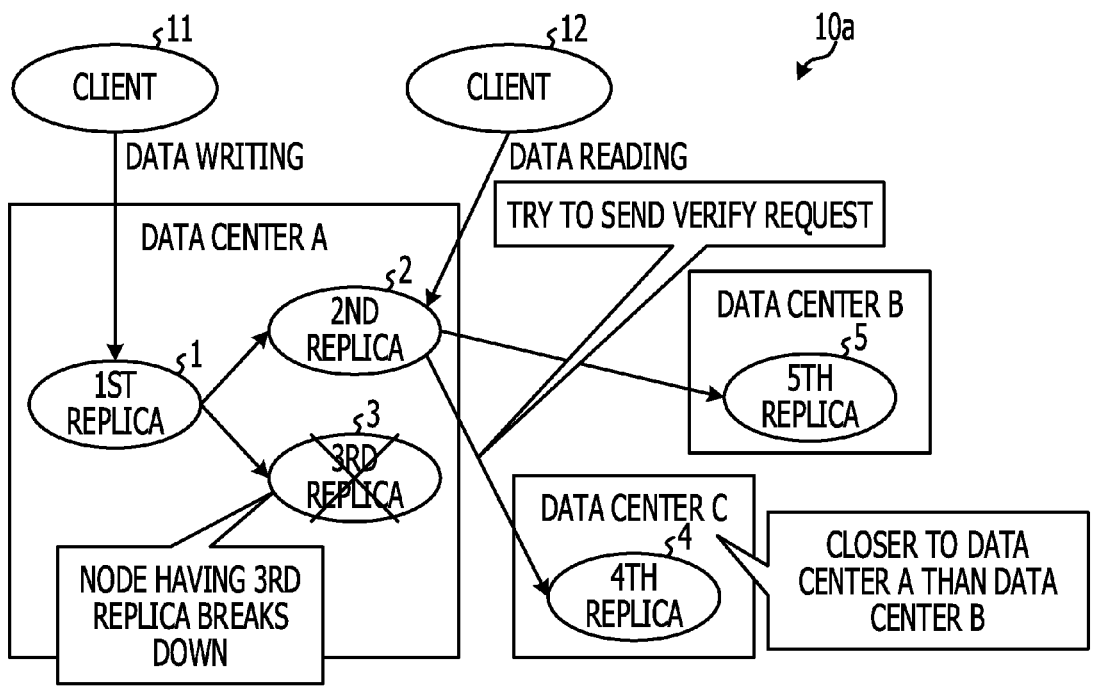
FIG. 1B illustrates an example of an information processing system for sending a verify request to a node in a different data center.

FIG. 1B illustrates an example of an information processing system for sending a verify request to a node in a different data center. As illustrated in FIG. 1B, an information processing system 10a includes a data center C. The information processing system 10a performs the multipath replication with the nodes 1 to 5 in the same way as the information processing system 10 except for the fact that the node 4 is in the data center C instead of the data center A. The data center C is closer to the data center A than the data center B.

The node 2 sends the verify request to the node 4 in the different data center C upon receiving a read request concerning the data undergoing updating from the client 12. Since the data center C is closer to the node 2 than the data center B, the node 2 in the data center C may receive the reply concerning the verify request from the node 4 earlier than the reply concerning the version request from the node 5.

In this way, the node 2 is able to reply earlier to the client 12 by sending the verify request to a node in a data center closer than the data center containing the node of a sending destination of the version request.

Figure 2:
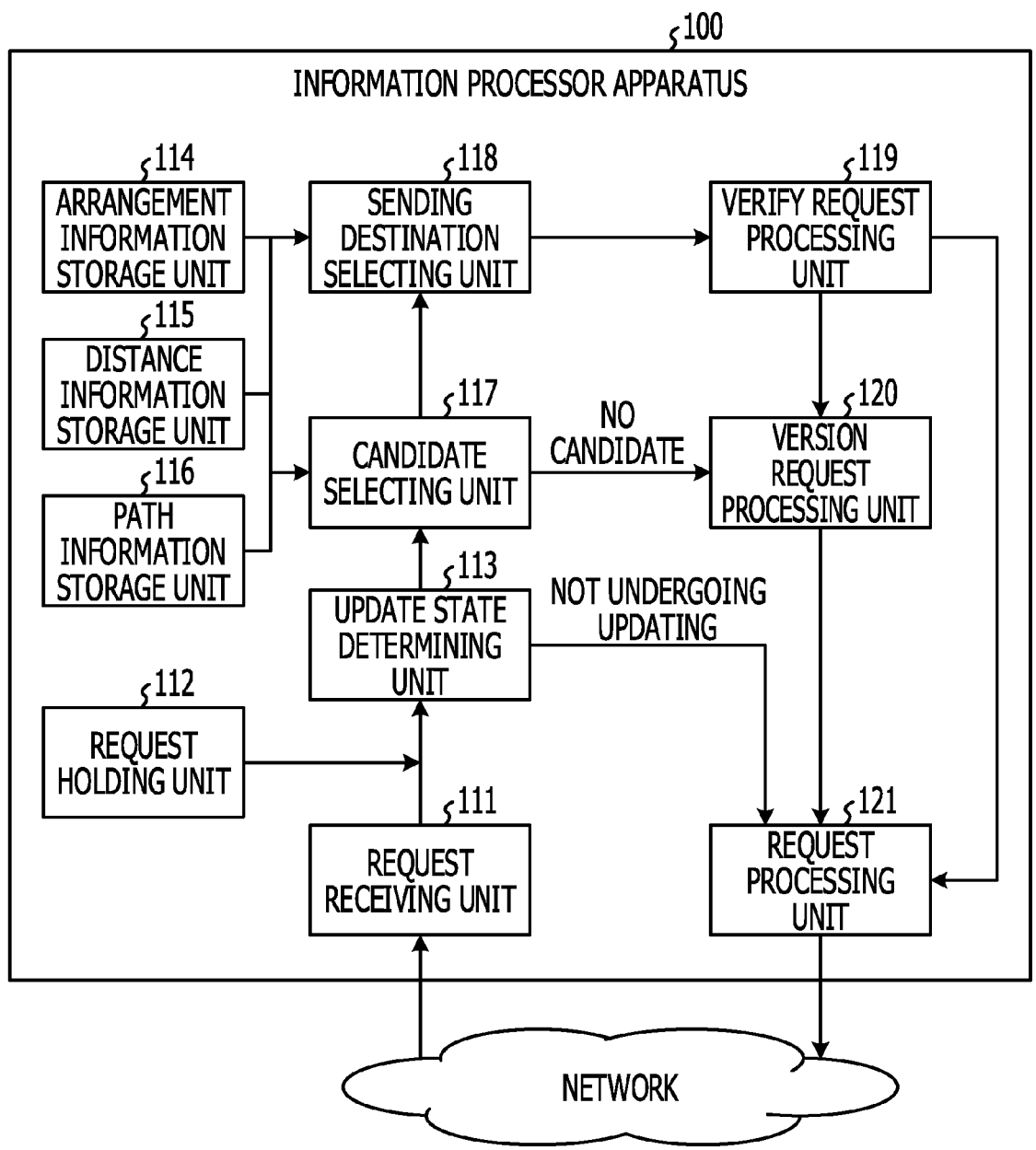
FIG. 2 is a block diagram of a functional configuration of an information processor apparatus according to the embodiment.

Next, a functional configuration of an information processor apparatus according to the embodiment will be explained. FIG. 2 is a block diagram of a functional configuration of an information processor apparatus according to the embodiment. As illustrated in FIG. 2, an information processor apparatus 100 includes a request receiving unit 111, a request holding unit 112, an update state determining unit 113, an arrangement information storage unit 114, and a distance information storage unit 115. The information processor apparatus 100 further includes a path information storage unit 116, a candidate selecting unit 117, a sending destination selecting unit 118, a verify request processing unit 119, a version request processing unit 120, and a request processing unit 121. The information processor apparatus 100 corresponds to a node illustrated in FIGS. 1A and 1B.

The request receiving unit 111 receives data access requests from clients over a network. The request holding unit 112 holds write requests and write data when data is undergoing updating due to a write request from a client.

The update state determining unit 113 refers to the request holding unit 112 to determine whether data subject to an access request received by the request receiving unit 111 is undergoing updating. The update state determining unit 113 transfers the access request to the candidate selecting unit 117 if the data is undergoing updating. The update state determining unit 113 transfers the access request to the request processing unit 121 if the data is not undergoing updating.

Figure 3:
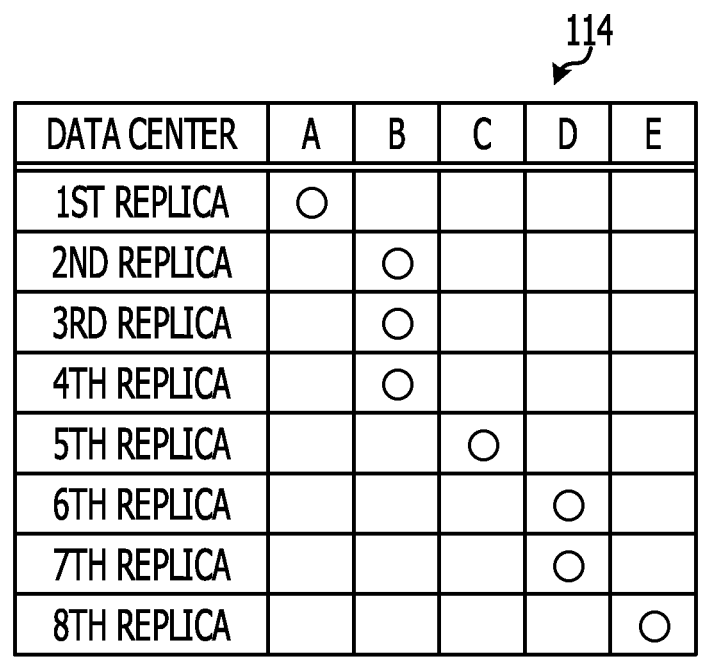
FIG. 3 illustrates an example of an arrangement information storage unit.

The arrangement information storage unit 114 stores information that indicates a replica arrangement, that is, which nodes that store replicas are in which data centers. FIG. 3 illustrates an example of the arrangement information storage unit 114 and FIG. 4 illustrates an example of a replica arrangement.

Figure 4:
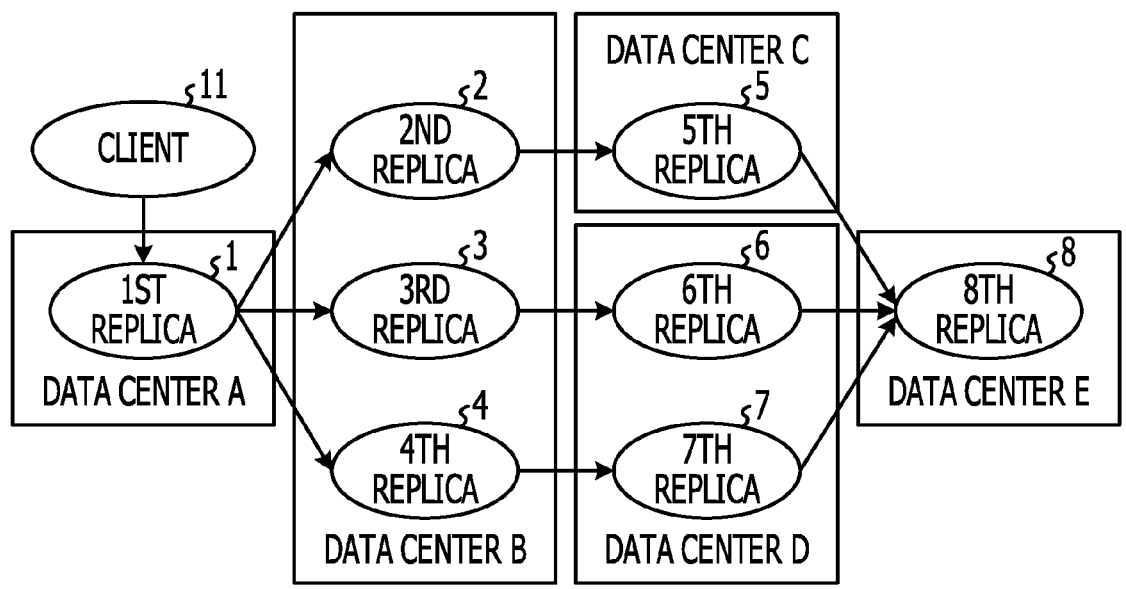
FIG. 4 illustrates an example of a replica arrangement.

As illustrated in FIG. 4, the node 1 that stores the first replica is in the data center A. The node 2 that stores the second replica, the node 3 that stores the 3rd replica, and the node 4 that stores the fourth replica are in the data center B. The node 5 that stores the fifth replica is in a data center C. A node 6 that stores a sixth replica and a node 7 that stores a seventh replica are in a data center D. A node 8 that stores an eighth replica is in a data center E.

When the node 1 receives a write request from the client 11, the node 1 sends an update request to the node 2, the node 3, and the node 4. The node 2 sends the update request to the node 5, the node 3 sends the update request to the node 6, and the node 4 sends the update request to the node 7. The node 5, the node 6, and the node 7 then send the update request to the node 8.

The information stored by the arrangement information storage unit 114 describes the replica arrangement illustrated in FIG. 3 and FIG. 4. As illustrated in FIG. 3, the arrangement information storage unit 114 stores information of the data centers in association with each replica. For example, the arrangement information storage unit 114 stores information that indicates that the data center A is associated with the first replica.

The distance information storage unit 115 stores communication latency based on communication between the nodes. FIG. 5 illustrates an example of the distance information storage unit 115. FIG. 5 illustrates the information stored by the distance information storage unit 115 concerning the replica arrangement illustrated in FIG. 4.

As illustrated in FIG. 5, the distance information storage unit 115 stores communication latency based on communication with another replica for each replica. Since the replicas and the nodes have a one-to-one correspondence in this case, the distance information storage unit 115 stores the communication latency based on communication with other nodes for each node. Times in FIG. 5 are indicated in units of milliseconds (ms). For example, the communication latency due to communication between the node 1 that stores the first replica and the node 2 that stores the second replica is 100 ms.

Figure 6:
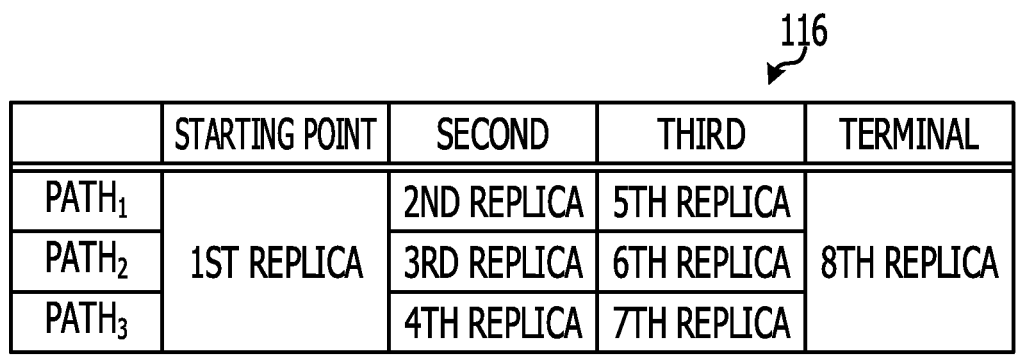
FIG. 6 illustrates an example of a path information storage unit.

The path information storage unit 116 stores information of paths in the multipath replication. FIG. 6 illustrates an example of the path information storage unit 116. FIG. 6 illustrates information stored by the path information storage unit 116 concerning the multipath replication and the replica arrangement illustrated in FIG. 4.

As illustrated in FIG. 6, the path information storage unit 116 stores, for each path, a starting node, a second node, a third node, and a terminal node that form a path. For example, the starting node in a path 1 is the node 1 that stores the first replica. The second node is the node 2 that stores the second replica. The third node is the node 5 that stores the fifth replica. The terminal node is the node 8 that stores the eighth replica.

The candidate selecting unit 117 refers to the arrangement information storage unit 114, the distance information storage unit 115, and the path information storage unit 116 to select a candidate node for sending a verify request. The candidate selecting unit 117 selects nodes that satisfy the following two conditions as the candidate where the node that the access request reached is A and any node except for A and the starting node is B.

The first condition is that a communication delay time from A to B is less than a communication delay time from A to a terminal node closest to A. The terminal node closest to A is the node that sends the version request. A node with a communication delay time larger than the communication delay time for the version request is not set as a candidate since the processing of the version request is completed earlier at that node. For example, the terminal node is not set as the candidate since the first condition is not satisfied.

The second condition is that an update request propagation time from the starting node to A plus an elapsed time from when A sends the update request is less than an update request propagation time from the starting node to B. In this case, since the update request propagation time from the starting node to A plus the elapsed time from when A sends the update request is equal to an elapsed time from when the starting node sends the update request, the second condition is a condition that the elapsed time from when the starting node sends the update request plus the communication delay time from A to B is less than the update request propagation time from the starting node to B. That is, the fact that the update request does not reach B until the verify request reaches B satisfies the second condition for the candidate.

Figure 7:
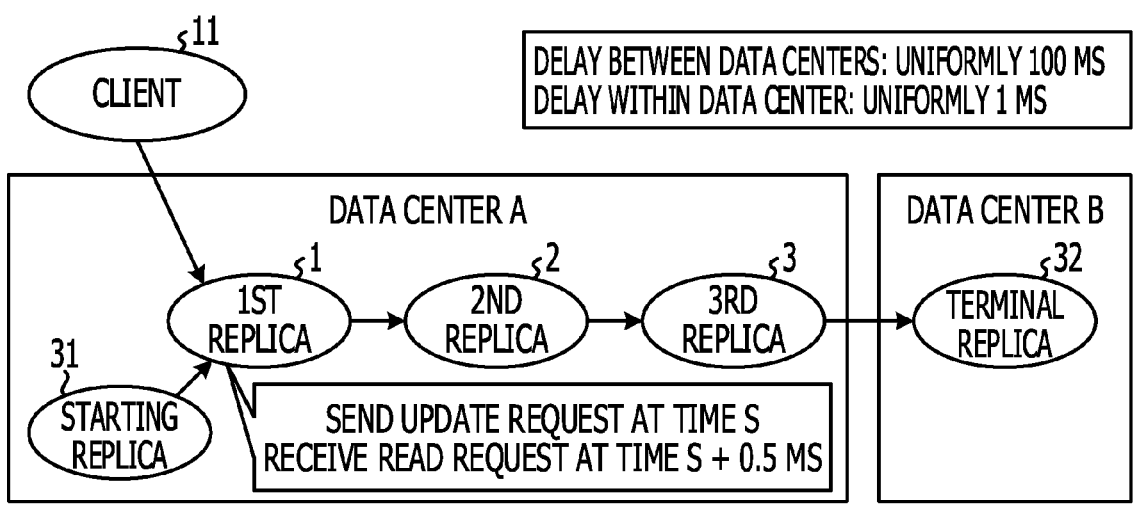
FIG. 7 illustrates an example of candidate selection by a candidate selecting unit.

FIG. 7 illustrates an example of candidate selection by the candidate selecting unit 117. As illustrated in FIG. 7, a node 31 that stores the starting replica, the node 1 that stores the first replica, the node 2 that stores the second replica, and the node 3 that stores the third replica are in the data center A. A node 32 that stores a terminal replica is in the data center B.

The update request propagates along the path: node 31→node 1→node 2→node 3→node 32; the communication latency between the data centers is uniformly 100 ms; and the communication latency inside each data center is uniformly 1 ms. It is assumed that the node 1 sends the update request at a time S and receives a read request from the client 11 at the time S plus 0.5 ms.

The node 2 satisfies the first condition since the communication latency from the node 1 to the node 2 which is 1 ms is less than the communication latency from the node 1 to the terminal node 32 that is closest to the node 1 which is 100 ms.

However, the update request propagation time from the node 31 to the node 1 plus the elapsed time from when the node 1 sends the update request plus the communication latency from the node 1 to the node 2 equals 1 ms plus 0.5 ms plus 1 ms which altogether equals 2.5 ms. Conversely, the node 2 does not satisfy the second condition since the update request propagation time from the node 31 to the node 2 equals 2 ms.

The node 3 satisfies the first condition since the communication delay time from the node 1 to the node 3 which is 1 ms is less than the communication delay time from the node 1 to the terminal node 32 that is closest to the node 1 which is 100 ms. The update request propagation time from the node 31 to the node 1 plus the elapsed time from when the node 1 sends the update request plus the communication delay time from the node 1 to the node 3 equals 1 ms plus 0.5 ms plus 1 ms which altogether equals 2.5 ms. Conversely, the node 3 also satisfies the second condition and becomes the candidate for the verify request sending destination since the update request propagation time from the node 31 to the node 3 is 3 ms.

Returning to FIG. 2, the sending destination selecting unit 118 refers to the arrangement information storage unit 114, the distance information storage unit 115, and the path information storage unit 116 to select a destination of the verify request from the plurality of candidates selected by the candidate selecting unit 117.

Specifically, the sending destination selecting unit 118 sorts the destination candidates of the verify request according to the length of the communication delay time from the node that received the access request in order from the shortest to the longest. The sending destination selecting unit 118 then selects the first candidate from the sorting as the verify request sending destination. The sending destination selecting unit 118 sorts a plurality of nodes having the same communication latency from the node that received the access request in order from the node having the longest time until receiving the update request.

Specifically, when the node that received the access request is assumed to be A and the communication latency to a candidate B is shorter than the communication latency to a candidate C, the sending destination selecting unit 118 arranges the candidate B before the candidate C in the sorting. If the communication latency are the same, the sending destination selecting unit 118 sorts the candidates so that nodes with longer update request propagation times from the starting node are at the front.

Figure 8:
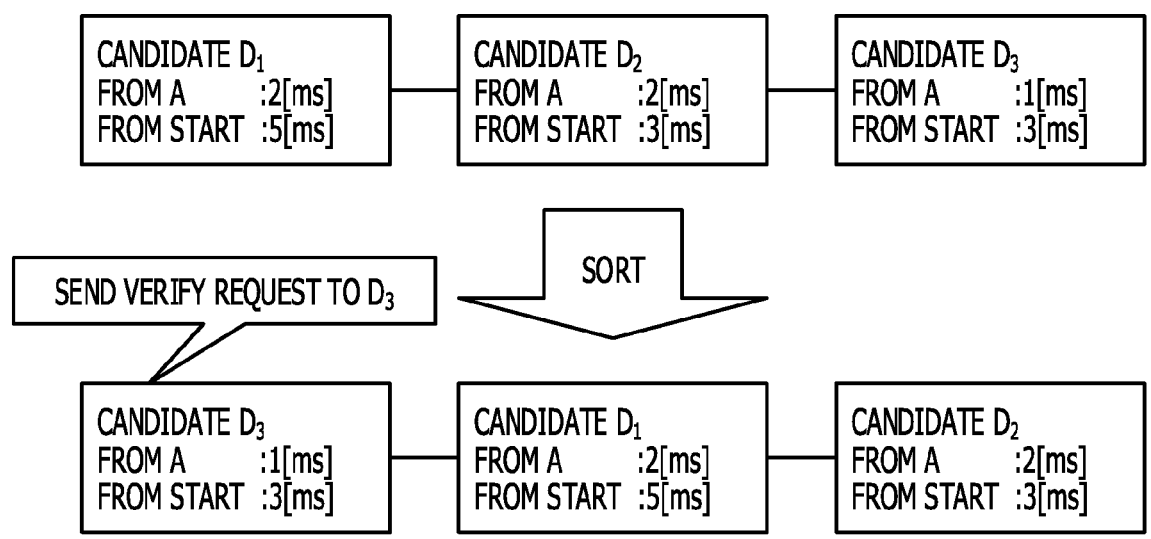
FIG. 8 illustrates an example of sending destination selection by a sending destination selecting unit.

FIG. 8 illustrates an example of the sending destination selection by the sending destination selecting unit 118. It is assumed in FIG. 8 that the node that received the access request is A and that three candidates $D_1$ to $D_3$ are selected by the candidate selecting unit 117.

For the candidate $D_1$, the communication latency from A is 2 ms, and the propagation time of the update request from the starting node is 5 ms. For the candidate $D_2$, the communication latency from A is 2 ms, and the propagation time of the update request from the starting node is 3 ms. For the candidate $D_3$, the communication latency from A is 1 ms, and the update request propagation time from the starting node is 3 ms.

The sending destination selecting unit 118 sorts the candidates so that the candidate $D_3$ having the communication latency from A of 1 ms is at the top of the list, and the candidates $D_1$ and $D_2$ having the same communication latency from A are sorted so that the candidate $D_1$ with the longer update request propagation time from the starting node is in front of the candidate 2. The sending destination selecting unit 118 then selects the candidate $D_3$ at the top of the list as the sending destination of the verify request.

Returning to FIG. 2, the verify request processing unit 119 sends the verify request to the candidate selected by the sending destination selecting unit 118. The verify request processing unit 119 then receives the reply from the sending destination and transfers the response to the request processing unit 121. The verify request processing unit 119 processes the verify requests received from other nodes. Specifically, the verify request processing unit 119 replies to the request source that the version is unclear when the data concerning the received verify request is undergoing updating. Conversely, if the data concerning the received verify request is not undergoing updating, the verify request processing unit 119 sends a reply to the request source indicating the version of the stored data.

The version request processing unit 120 sends the version request to the closest terminal node. The version request processing unit 120 then receives the reply from the sending destination of the verify request and transfers the response to the request processing unit 121. The version request processing unit 120 processes the version requests received from other nodes.

The request processing unit 121 determines the version of the data to send to the client and then sends the data to the client on the basis of the determination results by the update state determining unit 113, the replies concerning the verify request, and the replies concerning the version request.

Specifically, the request processing unit 121 sends the stored data to the client when the data involved in the access request is not undergoing updating. The request processing unit 121 sends the data of the version as the reply concerning the verify request upon receiving the information of that version when the data involved in the access request is undergoing updating. The request processing unit 121 sends the data of the version received with the reply concerning the version request to the client when there is no sending destination of the verify request or when the reply concerning the verify request is unclear while the data involved in the access request is undergoing updating.

Figure 9:
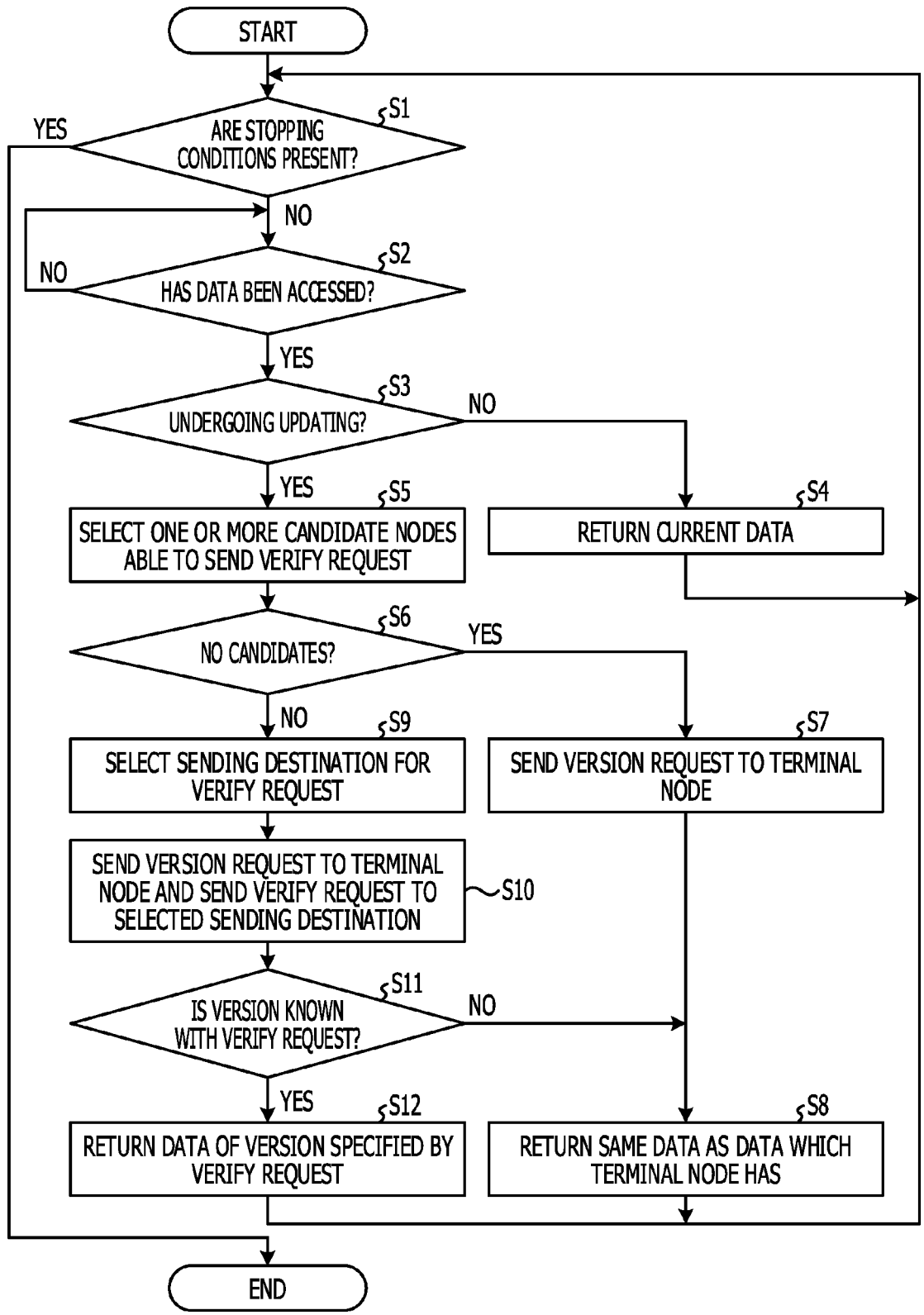
FIG. 9 is a flow chart of a processing flow performed by an information processor apparatus with respect to a data reading request.

The following describes a processing flow conducted by the information processor apparatus 100 for a data read request. FIG. 9 is a flow chart of a processing flow performed by the information processor apparatus 100 for a data reading request. As illustrated in FIG. 9, the information processor apparatus 100 determines whether stopping conditions for stopping the processing are present (S1). The processing is finished if stopping conditions are present. The stopping conditions in this case are set by a system administrator in order to, for example, protect the information processing system 10.

If there are no stopping conditions present, the information processor apparatus 100 determines whether an access to data has occurred (S2). If an access to data has occurred, the update state determining unit 113 determines whether the data involved in the access is undergoing updating (S3). If the data concerning the access is not undergoing updating, the request processing unit 121 returns the current data to the client (S4). The processing then returns to S1.

If the data concerning the access is undergoing updating, the candidate selecting unit 117 selects one or more candidate nodes that is able to send a verify request (S5). The candidate selecting unit 117 then determines whether there are any candidates (S6). If there are no candidates, the version request processing unit 120 sends a version request to the terminal node (S7). The request processing unit 121 then returns the data of the version that is the same version as the data stored in the terminal node to the client on the basis of the version that the version request processing unit 120 received as a reply to the version request (S8). The processing then returns to S1.

If there is one or more candidates, the sending destination selecting unit 118 selects a sending destination for the verify request (S9). The version request processing unit 120 sends a version request to the terminal node. The verify request processing unit 119 then sends the verify request to the sending destination selected by the sending destination selecting unit 118 (S10).

The request processing unit 121 determines whether the version is known with the verify request (S11). If the version is unknown, data of the version that is the same as the version of the data stored by the terminal node is sent to the client (S8). If the version is known, the request processing unit 121 returns the data of the version specified by the verify request to the client (S12). The processing then returns to S1.

In this way, if the version is known with the verify request, the request processing unit 121 is able to reply to the client without waiting for a reply to the version request by returning, to the client, the data of the version known with the verify request.

Figure 10:
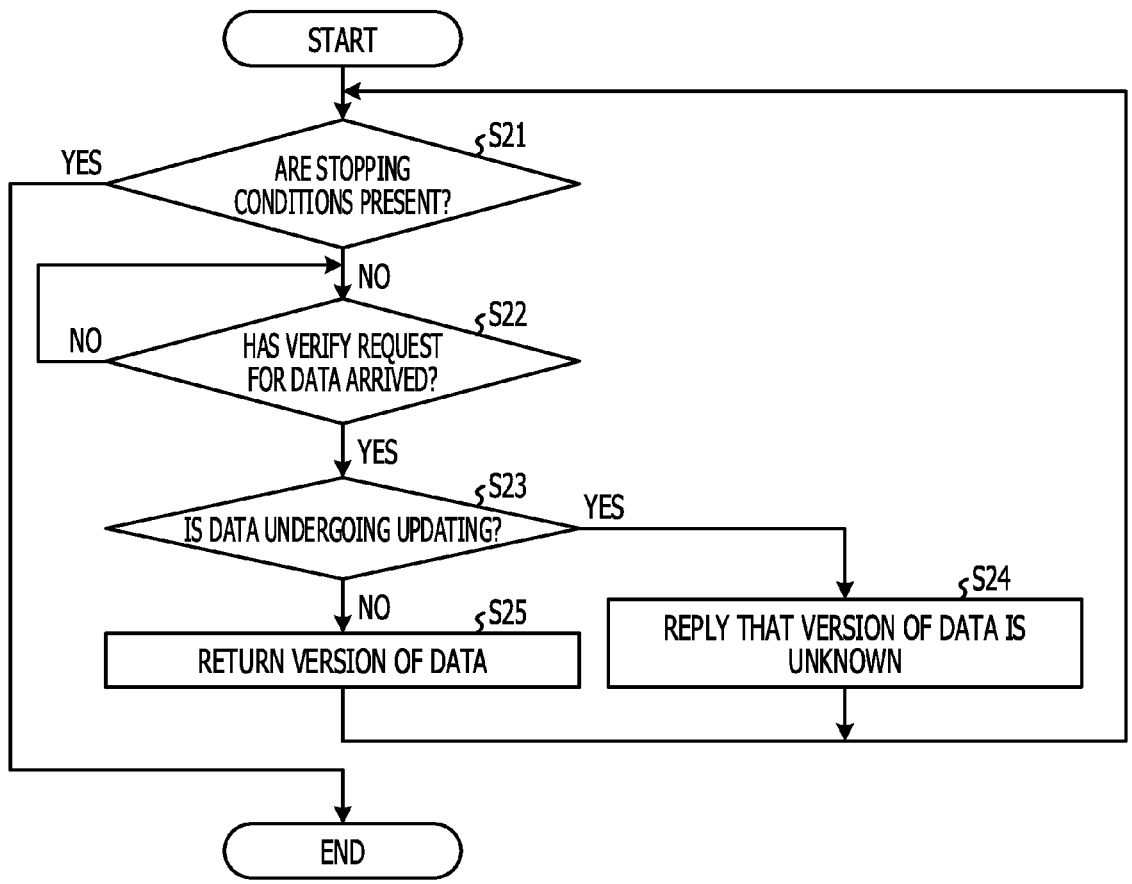
FIG. 10 is a flow chart of a processing flow for a verify request.

The following is a description of a processing flow for the verify request. FIG. 10 is a flow chart of a processing flow for the verify request. As illustrated in FIG. 10, the information processor apparatus 100 determines whether stopping conditions for stopping the processing are present (S21). The processing is finished if stopping conditions are present.

If there are no stopping conditions present, the verify request processing unit 119 determines whether a verify request for data has arrived (S22). If the verify request has arrived, a determination is made as to whether the applicable data is undergoing updating (S23).

If the data is undergoing updating, the verify request processing unit 119 sends a reply indicating that the version of the data is unknown (S24). If the data is not undergoing updating, the verify request processing unit 119 returns the version of the data (S25). The processing then returns to S21.

As described above, in the embodiment, the candidate selecting unit 117 refers to the arrangement information storage unit 114, the distance information storage unit 115, and the path information storage unit 116 to select a candidate for sending a verify request concerning the data undergoing updating. The sending destination selecting unit 118 then selects a sending destination for sending the verify request from the candidates selected by the candidate selecting unit 117, and the verify request processing unit 119 sends the verify request to the sending destination. If the version is known, the request processing unit 121 returns the data of the version known in the verify request to the client. Therefore, the information processing system 10 is able to reply to a read request for data undergoing updating more quickly compared with using only the version function.

The candidate selecting unit 117 selects an information processor apparatus that has not received the update request yet as the candidate for the sending destination of the verify request, up to the point that the verify request arrives. Therefore, the information processing system 10 is able to reply to a read request for data undergoing updating more quickly compared with using only the version function.

The sending destination selecting unit 118 selects an information processor apparatus with the shortest communication latency as the verify request sending destination from the plurality of candidates for the verify request sending destination. Therefore, the information processor apparatus that receives the read request concerning the data undergoing updating is able to send the verify request to the information processor apparatus that obtained the reply the earliest.

The sending destination selecting unit 118 selects, from a plurality of candidates for the sending destination of the verify request, the information processor apparatus which receives the update request the latest in the multipath replication path when a plurality of information processor apparatuses have the same short communication latency. Therefore, the information processor apparatus that received the read request concerning the data undergoing updating is able to send the verify request to the information processor apparatus that is assumed to have not updated the data.

While the embodiment has described information processor apparatuses, a control program for controlling the information processor apparatuses and having the same functions may also be used by realizing a functional configuration of the information processor apparatus with software. The following describes a hardware configuration of an information processor apparatus for executing the control program.

Figure 11:
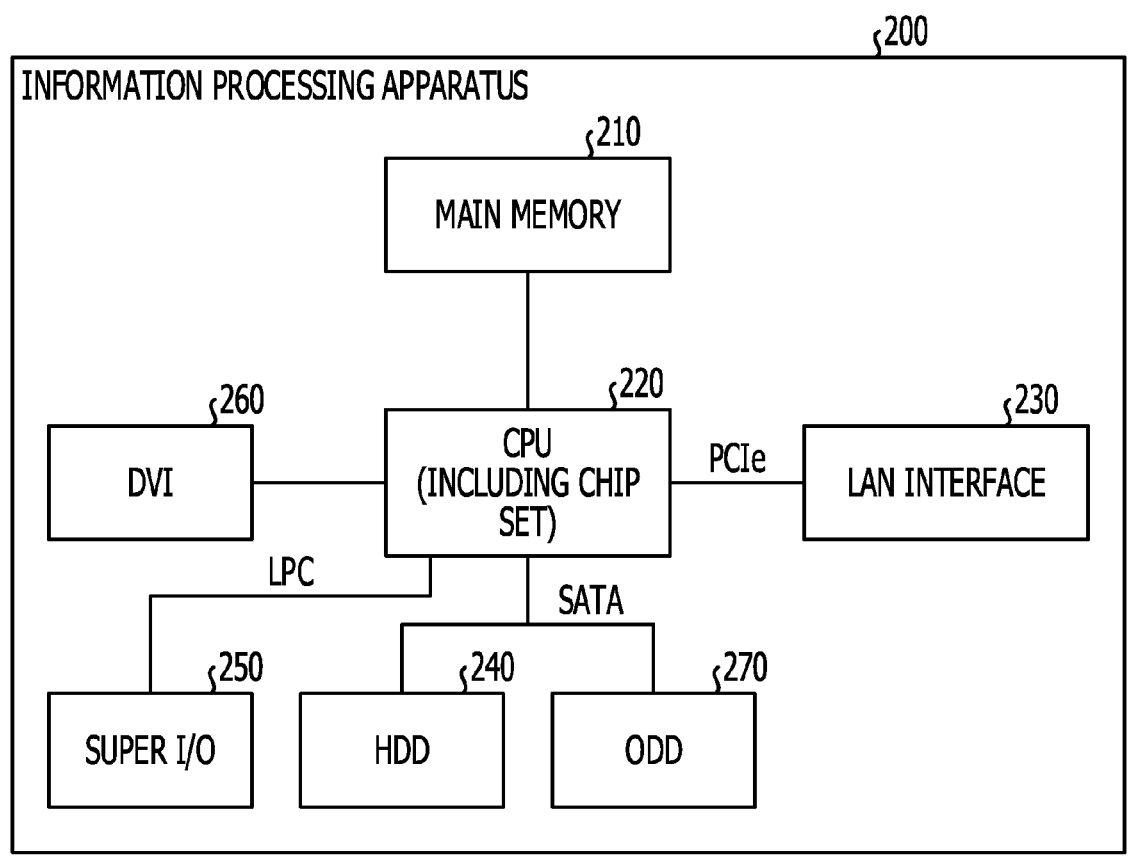
FIG. 11 is a block diagram of a hardware configuration of an information processor apparatus according to the embodiment.
Figure 12A:
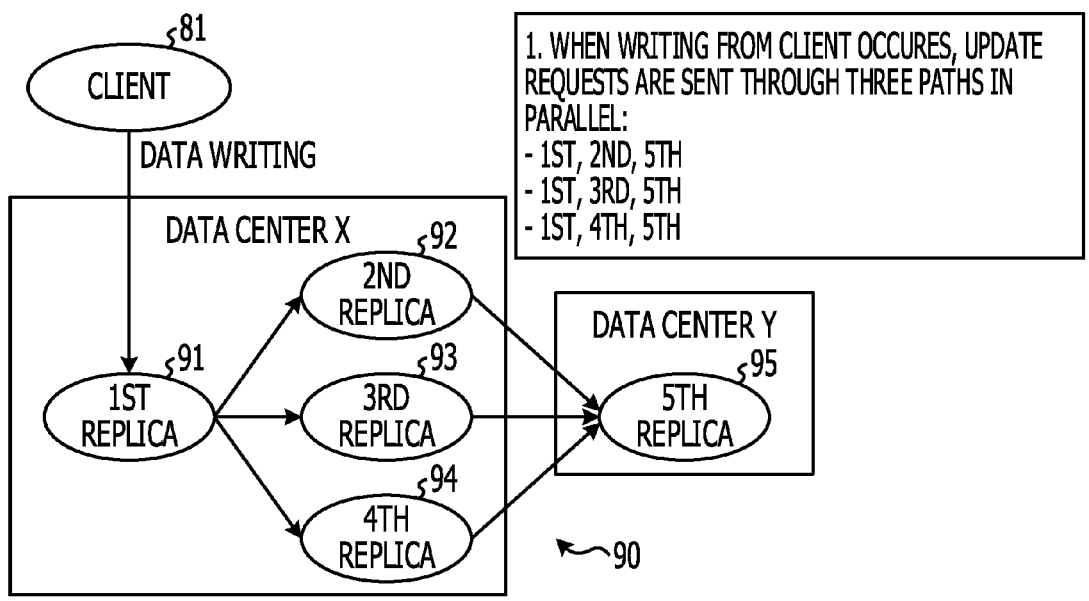
FIG. 12A is a diagram of related art for explaining the multipath replication.
Figure 12B:
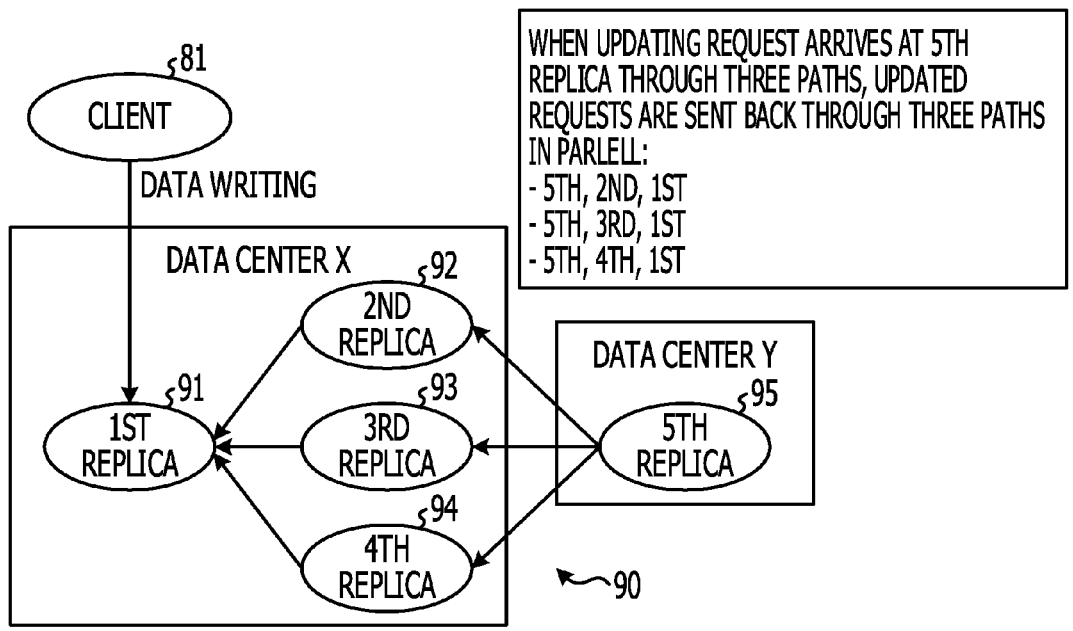
FIG. 12B is a diagram of related art for explaining the multipath replication.
Figure 13:
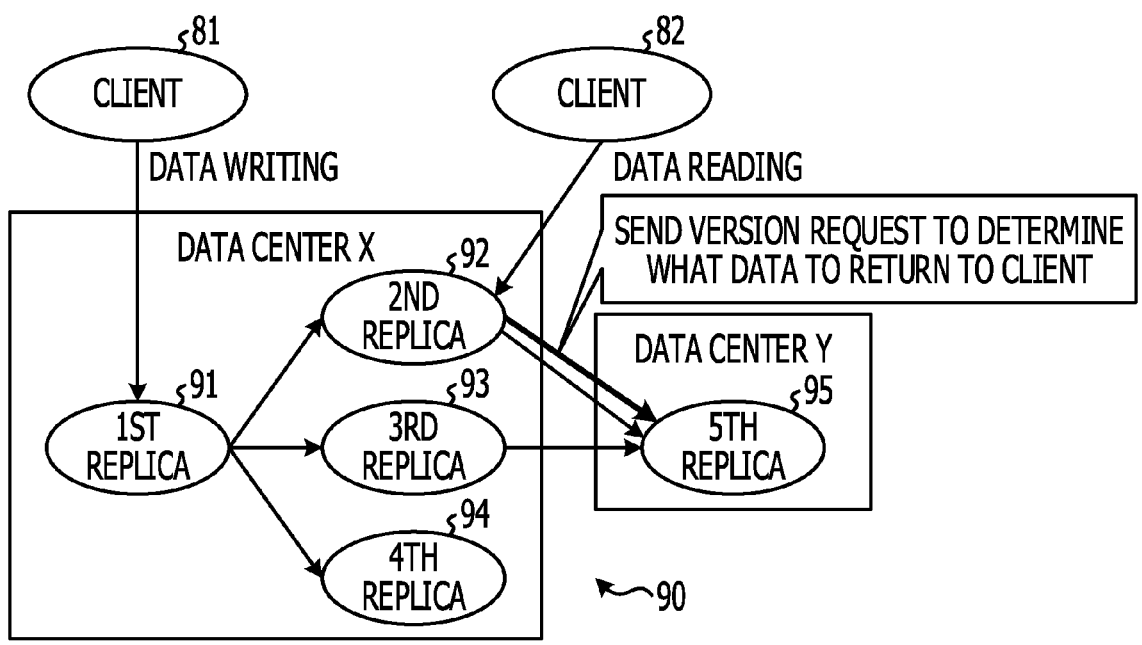
FIG. 13 is a diagram of related art for explaining a version function.

FIG. 11 is a block diagram of a hardware configuration of an information processor apparatus according to the embodiment. As illustrated in FIG. 11, an information processor apparatus 200 includes a main memory 210, a central processing unit (CPU) 220, and a local area network (LAN) interface 230. The information processor apparatus 200 also includes a hard disk drive (HDD) 240, a super input/output (I/O) 250, a digital visual interface (DVI) 260, and an optical disk drive (ODD) 270.

The main memory 210 is a memory for storing, for example, programs and mid-execution results of the programs. The CPU 220 is a central processing device for reading and executing programs in the main memory 210. The CPU 220 includes a chip set having a memory controller.

The LAN interface 230 is an interface for connecting the information processor apparatus 200 to other information processor apparatuses through a LAN. The HDD 240 is a disk device for storing programs and data. The super I/O 250 is an interface for connecting input devices such as a mouse or a keyboard. The DVI 260 is an interface for connecting a liquid crystal display device. The ODD 270 is a device for performing reading and writing on a DVD.

The LAN interface 230 is connected to the CPU 220 through a PCI express. The HDD 240 and the ODD 270 are connected to the CPU 220 through a serial advanced technology attachment (SATA). The super I/O 250 is connected to the CPU 220 through a low pin count (LPC) bus.

A control program to be executed by the information processor apparatus 200 is stored on a DVD, read from the DVD by the ODD 260, and installed in the information processor apparatus 200. Alternatively, the control program may be stored in a database in another information processing system connected through the LAN interface 230, and installed in the information processing system 200 after being read from the database. The installed control program is stored in the HDD 240, read by the main memory 220, and executed by the CPU 220.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A control method executed by a system including a plurality of computers, the plurality of computers including a first computer, a plurality of second computers coupled to the first computer, and a third computer coupled to the plurality of second computers, the plurality of computers respectively storing a replication of data, the plurality of second computers arranged on a plurality of routes between the first computer and the third computer, the control method comprising:
transmitting, by the first computer, an update request to the plurality of routes, when the update request is received from a first client device;
generating, by the third computer, updated data by updating the replication of data stored in the third computer and transmitting an updated request to the plurality of routes, when the update request is received from all of the plurality of routes;
generating, by the plurality of second computers, the updated data by updating the replication of data stored in the plurality of second computers, when the updated request is received from the third computer;
receiving, by a target computer of the plurality of second computers which is arranged on a first route among the plurality of routes, a read request of the data from a second client device;
selecting one of the plurality of second computers which is arranged on a second route different from the first route among the plurality of routes, as a query destination;
transmitting a verify request to inquire whether the update request has been received, to the query destination;
transmitting the updated data to the second client device when the query destination has received the update request; and
transmitting the data before the updating to the second client device when the query destination has not received the update request.

2. The control method according to claim 1, further comprising:
transmitting, by the target computer, a version request to the third computer, the version request being a request to inquire regarding a version of the data stored in the third computer, when the verify request is transmitted, and
wherein the transmitting of the data to the second client device includes:
transmitting the data of the version specified by the verify request to the second client device when a reply from the query destination includes information of a version of the data stored in the query destination, and
transmitting data of the same version as the data stored in the third computer to the second client device when the reply from the query destination does not include the information of the version.

3. The control method according to claim 1, wherein the selecting of the query destination includes:
selecting a fourth computer among the plurality of second computers as the query destination when a delay time during communication with the fourth computer is shorter than a delay time during communication with the third computer, and when a sum of an elapsed time from the time when the first computer sent the update request and a delay time during communication with the fourth computer is smaller than a propagation time of the update request from the first computer to the fourth computer.

4. The control method according to claim 3, wherein the selecting of the query destination includes selecting a computer with the shortest delay time during communication when there are a plurality of fourth computers.

5. The control method according to claim 4, wherein the selecting of the query destination includes sorting the plurality of fourth computers in order from the shortest delay time during communication to the longest, and selecting, as the query destination, the one of the plurality of fourth computers with the shortest delay time during communication according to the sorting.

6. The control method according to claim 4, wherein the selecting of the query destination includes selecting the one of the plurality of fourth computers with the longest propagation time of the update request from the first computer when there are a plurality of computers included in the plurality of fourth computers with the shortest delay time during communication.

7. The control method according to claim 6, wherein the selecting of the query destination includes sorting according to the longest propagation time of the update request from the first computer when there are a plurality of computers included in the plurality of fourth computers with the shortest delay time during communication, and selecting the one of the plurality of fourth computers with the longest propagation time of the update request according to the sorting.

8. The control method according to claim 1, further comprising:
receiving, by the target computer, a reply indicating that the version is unknown from the query destination when the data is undergoing updating, and
receiving, by the target computer, the information of the version of the data from the query destination when the data is not undergoing updating.

9. The control method according to claim 1,
wherein the first computer and the plurality of second computers are located in a first area, and the third computer is located in a second area different from the first area.

10. An information processing system, comprising:
a plurality of computers including a first computer, a plurality of second computers coupled to the first computer, and a third computer coupled to the plurality of second computers, the plurality of computers respectively storing a replication of data, the plurality of second computers being arranged on a plurality of routes between the first computer and the third computer, wherein
the first computer is configured to transmit an update request to the plurality of routes, when the update request is received from a first client device,
the third computer is configured to generate updated data by updating the replication of data stored in the third computer and transmit an updated request to the plurality of routes, when the update request is received from all of the plurality of routes, and
the plurality of second computers are configured to generate the updated data by updating the replication of data stored in the plurality of second computers, when the updated request is received from the third computer, and
a target computer of the plurality of second computers which is arranged on a first route among the plurality of routes, is configured to:
receive a read request of the data from a second client device, select one of the plurality of second computers which is arranged on a second route different from the first route among the plurality of routes, as a query destination, transmit a verify request to inquire whether the update request has been received, to the query destination, transmit the updated data to the second client device when the query destination has received the update request, and transmit the data before the updating to the second client device when the query destination has not received the update request.

11. A control method executed by a system including a plurality of computers, the plurality of computers including a first computer, a plurality of second computers coupled to the first computer, and a third computer coupled to the plurality of second computers, the plurality of computers respectively storing a replication of data, the plurality of second computers arranged on a plurality of routes between the first computer and the third computer, the control method comprising:

transmitting, by the first computer, a data write request to the plurality of routes, when the data write request is received from a first client device;

generating, by the third computer, updated data by updating the replication of data stored in the third computer and transmitting an updated request to the plurality of routes, when the data write request is received from all of the plurality of routes;

generating, by the plurality of second computers, the updated data by updating the replication of data stored in the plurality of second computers, when the updated request is received from the third computer;

receiving, by a target computer of the plurality of second computers which is arranged on a first route among the plurality of routes, a data read request from a second client device;

selecting one of the plurality of second computers which is arranged on a second route different from the first route among the plurality of routes, as a query destination, when the data is undergoing updating due to the data write request, transmitting a verify request to inquire whether the data is undergoing updating, to the query destination;

transmitting the updated data to the second client device when the data is not undergoing updating, and transmitting the data before the updating to the second client device when the data is undergoing updating.

12. The control method according to claim 11, wherein the selecting of the query destination includes:

selecting a fourth computer among the plurality of second computers as the query destination when a delay time during communication with the fourth computer is shorter than a delay time during communication with the third computer, and when a sum of an elapsed time from the time when the first computer sent the data write request and a delay time during communication with the fourth computer is smaller than a propagation time of the data write request from the first computer to the fourth computer.

13. The control method according to claim 12, wherein the selecting of the query destination includes selecting a computer with the shortest delay time during communication when there are a plurality of fourth computers.

14. The control method according to claim 13, wherein the selecting of the query destination includes sorting the plurality of fourth computers in order from the shortest delay time during communication to the longest, and selecting, as the query destination, the one of the plurality of fourth computers with the shortest delay time during communication according to the sorting.

15. The control method according to claim 13, wherein the selecting of the query destination includes selecting the one of the plurality of fourth computers with the longest propagation time of the data write request from the first computer when there are a plurality of computers included in the plurality of fourth computers with the shortest delay time during communication.

16. The control method according to claim 15, wherein the selecting of the query destination includes sorting according to the longest propagation time of the data write request from the first computer when there are a plurality of computers included in the plurality of fourth computers with the shortest delay time during communication, and selecting the one of the plurality of fourth computers with the longest propagation time of the data write request according to the sorting.

* * * * *